United States Patent [19]

Shimazoe et al.

[11] 4,364,276

[45] Dec. 21, 1982

[54] DIFFERENTIAL PRESSURE MEASURING TRANSDUCER ASSEMBLY

[75] Inventors: Michitaka Shimazoe; Yoshitaka Matsuoka, both of Mito; Ryozo Akahane, Katsuta; Yasushi Shimizu, Katsuta; Hideyuki Nemoto, Katsuta; Masanori Tanabe, Hitachi, all of Japan

[73] Assignee: Hitachi, Ltd., Tokyo, Japan

[21] Appl. No.: 217,023

[22] Filed: Dec. 16, 1980

[30] Foreign Application Priority Data

Dec. 19, 1979 [JP] Japan ................................. 54-164128

[51] Int. Cl.³ ............................................. G01L 9/06
[52] U.S. Cl. ......................................... 73/721; 73/706
[58] Field of Search ................. 73/721, 727, 720, 726, 73/706, 708, 716

[56] References Cited

U.S. PATENT DOCUMENTS

| | | | |
|---|---|---|---|
| 3,341,794 | 9/1967 | Stedman | 73/720 |
| 3,712,143 | 1/1973 | Weaver et al. | 73/720 |
| 4,085,620 | 4/1978 | Tanaka | 73/727 |
| 4,127,840 | 11/1978 | House | 73/727 |
| 4,135,408 | 1/1979 | DiGiovanni | 73/721 |
| 4,173,149 | 11/1979 | Critten et al. | 73/720 |
| 4,222,277 | 9/1980 | Kurtz et al. | 73/721 |
| 4,314,225 | 2/1982 | Tominaga et al. | 73/721 |

*Primary Examiner*—Donald O. Woodiel
*Attorney, Agent, or Firm*—Antonelli, Terry & Wands

[57] ABSTRACT

A differential pressure measuring transducer assembly including a measuring diaphragm formed of semiconductor material having gauge resistance elements on one surface thereof and a central boss area of large thickness and a peripheral support flange on the other surface thereof defining therebetween an annular portion of small thickness. The measuring diaphragm is attached at the peripheral support flange to a glass support member and a metallic support member formed with pressure conducting bores respectively communicating with each other. The metallic support member is formed of material having a Young's modulus substantially equal to that of the measuring diaphragm.

11 Claims, 8 Drawing Figures

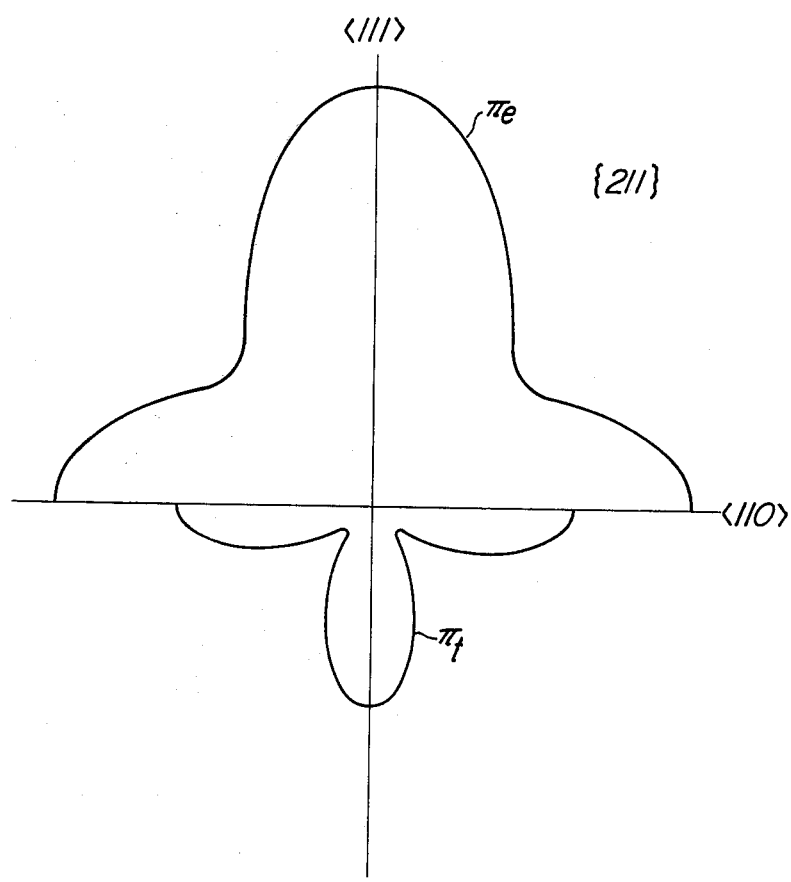

DIFFERENTIAL PRESSURE MEASURING TRANSDUCER ASSEMBLY

BACKGROUND OF THE INVENTION

1. Field of the Invention

This invention relates to a differential pressure measuring transducer assembly using a measuring diaphragm of semiconductor material for measuring the differential pressure between a fluid under high pressure and a fluid under low pressure and producing an electrical output when there is a difference between the two pressures being measured.

2. Description of the Prior Art

In one type of measuring diaphragm of semiconductor material, such as silicon, the diaphragm having a center area and a peripheral area of large thickness and an intermediate area of small thickness as disclosed in U.S. Pat. No. 4,135,408, for example, includes a strain producing portion disposed in the small thickness intermediate area in which a gauge resistance is provided by a dispersion method or an ion plantation method. This type of measuring diaphragm offers the advantage that substantially the same characteristics can be obtained even if the pressure is applied in different directions (whether the pressure is applied on the gauge surface or on the opposite side).

Although the gauge resistance is insulated from the measuring diaphragm of silicon by a P-N boundary, the P-N boundary has a relatively low insuration resistance. Thus it is quite difficult to prevent an electrical disturbance from outside from influencing the gauge resistance. In U.S. Pat. No. 4,135,408 referred to hereinabove, the measuring diaphragm of silicon is not electrically insulated. In the differential pressure measuring transducer assembly of this construction, it would be impossible to render the gauge resistance impervious a disturbance unless the transducer assembly as a whole is electrically insulated.

SUMMARY OF THE INVENTION

Electric insulation can be readily provided by insulating the measuring diaphragm alone. To this end, a research has been conducted on mounting a measuring diaphragm on a support member of glass having substantially the same coefficient of thermal expansion as the measuring diaphragm of semiconductor material. In a differential pressure measuring transducer assembly, high line pressures (hydrostatic pressures) of about 100 kg/cm$^2$ are applied to opposite side surfaces of the measuring diaphragm, and a pressure differential of as low as 0.1 kg/cm$^2$ need be measured between the two pressures. When the differential pressure measuring transducer assembly of the aforesaid structure was used under such condition, the measuring diaphragm and the glass support member underwent deformation as a given compressive force was exerted thereon by a high hydrostatic pressure, and an output was generated by the hydrostatic pressure. The output of the hydrostatic pressure caused errors to be produced in the measurements of the differential pressures. An examination has revealed that the measuring diaphragm which is formed of silicon has a Young's modulus which is distinct from that of glass and that the difference in Young's modulus between them is responsible for the difference in the amount of deformation between the measuring diaphragms and the glass support member.

Accordingly, this invention has as its object the provision of a differential pressure measuring transducer assembly in which the measuring diaphragm alone is electrically insulated from the transducer body and rendered impervious to the influences of hydrostatic pressures.

According to the invention, a measuring diaphragm of semiconductor material, such as silicon, is mounted on the differential pressure measuring body by means of a first support member formed of glass and a second support member formed of metal. The measuring diaphragm is formed with a large thickness area in the center and at the periphery, and a small thickness area between the large thickness areas in the center and at the periphery, with a gauge resistance being provided in the small thickness area. The first support member is formed of glass of the type, such as borosilicate glass, which has a coefficient of thermal expansion substantially equal to that of silicon. The second support member is formed of metal of the type, such as an Fe—Ni alloy, Fe—Ni—Co alloy, etc., which has a coefficient of thermal expansion and Young's modulus substantially equal to those of silicon. Thus, the measuring diaphragm and glass support member and the glass support member and metallic support member can be joined to each other by anodic bonding.

BRIEF DESCRIPTION OF THE DRAWINGS

FIG. 8 shows piezoresistance coefficients on the {211} surface.

DESCRIPTION OF THE PREFERRED EMBODIMENTS

Figure 1:
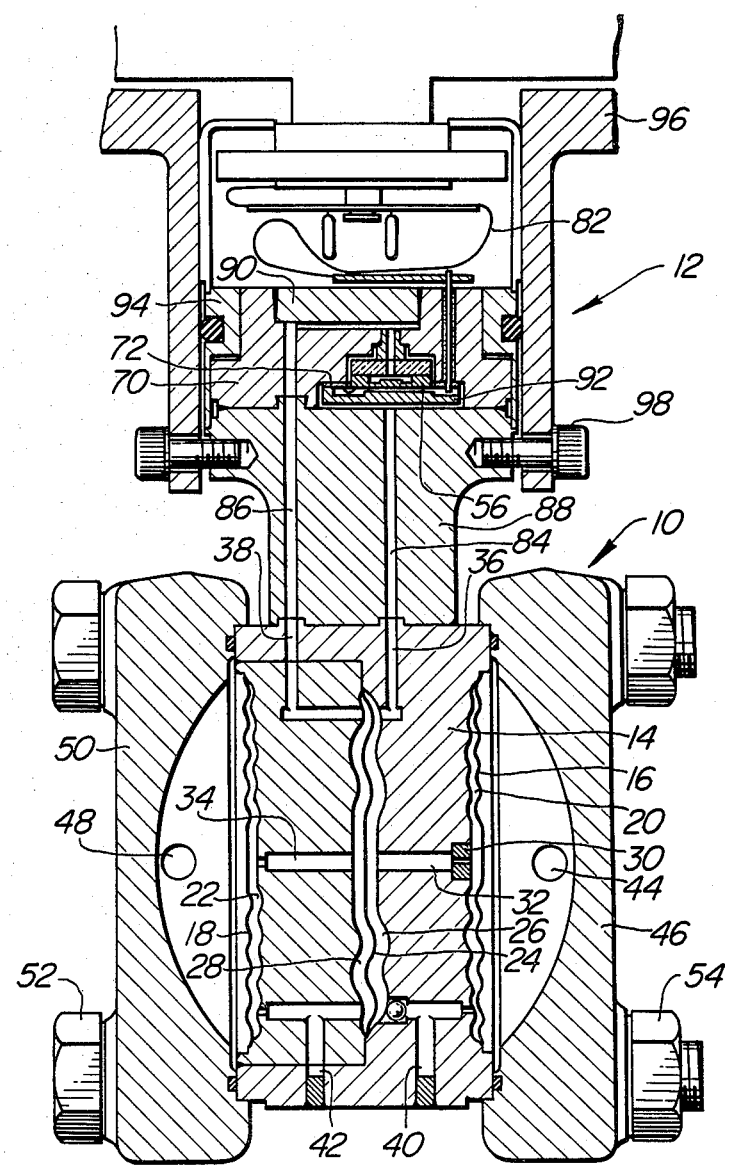
FIG. 1 is a sectional view of the differential pressure measuring transducer assembly in its entirety comprising one embodiment of the invention.

FIG. 1 is a sectional view of the differential pressure measuring transducer assembly in its entirety comprising a pressure receiving section generally designated by the reference numeral 10 and a differential pressure measuring section generally designated by the reference numeral 12. The pressure receiving section 10 includes a pressure receiving body 14 having a high-pressure-side sealing or pressure receiving diaphragm 16 and a low-pressure-side sealing or pressure receiving diaphragm 18, formed of stainless steel, (monel metal, hastelloy or tantalum when the fluid is highly corrosive), which are secured to its sides by welding to define a high-pressure-side pressure receiving chamber 20 and a low-pressure-side pressure receiving chamber 22 between them and the pressure receiving body 14. Secured by welding to the center of the pressure receiving body 14 is a center diaphragm 24 formed of stainless steel having higher stiffness than the material of the high-pressure-side and low-pressure-side pressure receiving diaphragms 16 and 18 which cooperates with the pressure receiving body 14 to define therebetween a high-pressure-side isolated chamber 26 and a low-pressure-side isolated chamber 28. The high-pressure-side pressure receiving chamber 20 is maintained in communication with the high-pressure-side isolated chamber 26 via a pressure conducting passage 32 throttled at 30, and the low-pressure-side pressure receiving chamber 22 is maintained in communication with the low-pressure-side isolated chamber 28 via a pressure conducting passage 34. The pressure receiving body 14 is formed with pressure conducting passages 36 and 38 communicating the high-pressure-side isolated chamber 26 and low-pressure-side isolated chamber 28 with the differential pressure measuring section 12, respectively. The pressure receiving body 14 is also formed with ports 40 and 42 for filling a non-compressive liquid, such as silicon oil, in the pressure receiving section 10, which are plugged to seal the assembly after the liquid is filled. A high-pressure-side flange 46 formed with a high pressure fluid inlet port 44 and a low-pressure-side flange 50 formed with a low pressure fluid inlet port 48 are secured to opposite sides of the pressure receiving body 14 in a manner to provide a cover to the high-pressure-side pressure receiving diaphragm 16 and low-pressure-side pressure receiving diaphragm 18, respectively, by being bolted at 52 and clamped by nuts 54 in positions near four corners thereof.

Figure 2:
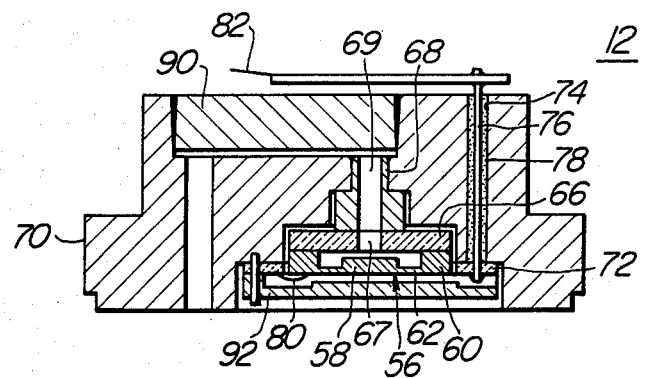
FIG. 2 is a detailed sectional view of the differential pressure measuring section.
Figure 3:
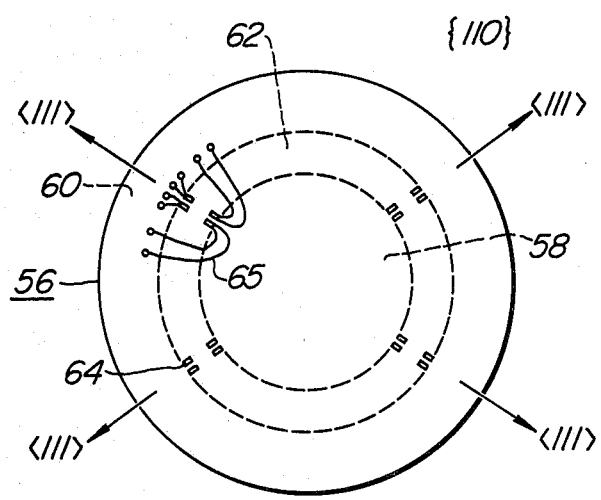
FIG. 3 is a plan view of the measuring diaphragm.

The differential pressure measuring section 12 includes a measuring diaphragm 56 disposed substantially in the center thereof which consists of monocrystal silicon of the n-type having a {110} surface. As shown clearly in FIGS. 2 and 3, the measuring diaphragm 56 includes a center boss area 58 and a peripheral support flange 60 of large thickness defining therebetween an annular strain producing portion 62 of small thickness. The center boss area 58 has a smaller thickness than the peripheral flange 60 to define a clearance between the measuring diaphragm 56 and a glass washer 66. A p-type gauge resistance 64 is provided on the annular strain producing portion 62 of small thickness which includes a plurality of resistance elements provided by a diffusion method or ion plantation method in a radial direction along a <111> axis in which sensitivity is maximized. After being formed on one surface with the gauge resistance 64, the measuring diaphragm 56 is machined or etched to provide the center boss area 58, peripheral flange 60 and annular portion 62 on the other surface thereof. Two gauge resistance elements 64 each are provided near the peripheral support flange 60 and near the center boss area 58 and connected together in bridge connections of a Wheatstone form to produce an output when a differential pressure is produced. The output of the gauge resistance 64 is taken out through aluminum wires 65. The aluminum wires 65 connected to the gauge resistance elements 64 near the center boss area 58 extend into the center boss area 58 and then change their direction to extend across the strain producing portion 62 to the peripheral support flange 60. Thus, the aluminum wires 65 are disposed above the strain producing portion 62 but spaced apart from the strain gauge 64, so that the influences exerted by the aluminum wires 65 on the gauge resistance 64 can be eliminated.

The measuring diaphragm 56 is supported by a differential pressure measuring body 70 formed of stainless steel through the glass washer 66 of a discal shape formed with a pressure conducting bore 67 and a metal support member 68 of a cylindrical shape formed with a pressure conducting bore 69. The glass washer 66 is formed of a vitreous material having a coefficient of thermal expansion substantially equal to the coefficient of thermal expansion ($3.125 \times 10^{-6}/°C$.) of silicon and the metallic support member 68 is formed of metallic material having a coefficient of thermal expansion and a Young's modulus substantially equal to the coefficient of thermal expansion and the Young's modulus ($1.732 \times 10^3$ kg/cm$^2$) of silicon.

More specifically, the glass washer 66 is made of borosilicate glass having a coefficient of thermal expansion $3.18 \times 10^{-6}/°C$. and a Young's modulus $6.68 \times 10^3$ kg/cm$^2$, and the metallic support 68 is made of an iron-nickel alloy containing 40% nickel (coefficient of thermal expansion, $3.6 \times 10^{-6}/°C$.; and Young's modulus, $1.57 \times 10^4$ kg/cm$^2$) or an iron-nickel-cobalt alloy containing 30% nickel and 17% cobalt (coefficient of thermal expansion, $5.4 \times 10^{-6}/°C$.; and Young's modulus, $1.25 \times 10^4$ kg/cm$^2$). The measuring diaphragm 56 is secured to the glass washer 66 and the glass washer 66 to the metallic support member 68 by anodic bonding, while the metallic support member 68 is joined to the differential pressure measuring body 70 by arc welding. The differential pressure measuring body 70 includes a printed board 72 of a doughnut shape formed of ceramics, the printed board 72 being substantially flush with the measuring diaphragm 56 and secured by brazing to the lower end portion of a conductive member 76 extending through the differential pressure measuring body 70 and formed with a plurality of apertures 74. The conductive member 76 is supported by a hermetic seal 78 in the apertures 74. The printed board 72 and the gauge resistance 64 of the measuring diaphragm 56 are connected together by conductors 80, and the conducting body 76 supported by the hermetic seal 78 is connected to a lead conductor 82.

The pressure receiving body 14 has welded thereto a metallic connector 88 formed with pressure conducting bores 84 and 86 and having the differential pressure measuring body 70 welded thereto. The differential pressure measuring body 70 has a plate 90 welded thereto to communicate the pressure conducting bore 86 with the pressure conducting bore 69 formed in the metallic support member 68. A protective cover 92 for the printed board 72 is interposed between the measuring diaphragm 56 and pressure conducting bore 84. The differential pressure measuring body 70 is annealed when the hermetic seal 78 is provided and has its corrosion resistance reduced. Thus, the protective cover 94 is provided. An amplifier section, not shown, is connected to the upper portion of the differential pressure measuring body 70 and disposed in an amplifier casing 96 secured to the metallic connector 88 by bolts 98.

The high-pressure-side isolated chamber 26 has a greater volume than the high-pressure-side pressure receiving chamber 20, and the low-pressure-side isolated chamber 28 has a greater volume than the low-pressure-side pressure receiving chamber 22. By this pressure difference, the central diaphragm 24 is prevented from being brought into engagement with the pressure receiving body 14 when the high-pressure-side pressure receiving diaphragm 16 or low-pressure-side pressure receiving diaphragm 18 is brought into engagement with the pressure receiving body by the action of an overload pressure. As a result, no overload pressure acts on the measuring diaphragm 56 and deterioration of the properties thereof and damage thereto that might otherwise be caused can be avoided.

A fluid under high pressure, such as a fluid to be processed, is introduced through the high pressure fluid inlet port 44 in the high-pressure-side flange 46 into the pressure receiving body 14, and the pressure of the high pressure fluid is applied, through the high-pressure-side pressure receiving diaphragm 16, pressure conducting passage 32, high-pressure-side separated chamber 26 and pressure conducting passages 36 and 84 to one side surface of the measuring diaphragm 56. Likewise, a fluid under low pressure is introduced through the low pressure fluid inlet port 48 in the low pressure flange 50, and the pressure of the low pressure fluid is applied, through the low-pressure-side pressure receiving diaphragm 18, pressure conducting passage 34, low-pressure-side separated chamber 28 and pressure conducting passages 38, 86, 69 and 67, to the other side surface of the measuring diaphragm 56. As a result, the strain producing portion 62 of the measuring diaphragm 56 produces strain corresponding to the measured pressure difference, and the resistance value of the gauge strain 64 shows a change. This change in the resistance value is transmitted through the conductors 80, printed board 72, and conductive members 76 and 82 to the amplifying section where the pressure difference is indicated.

Figure 4:
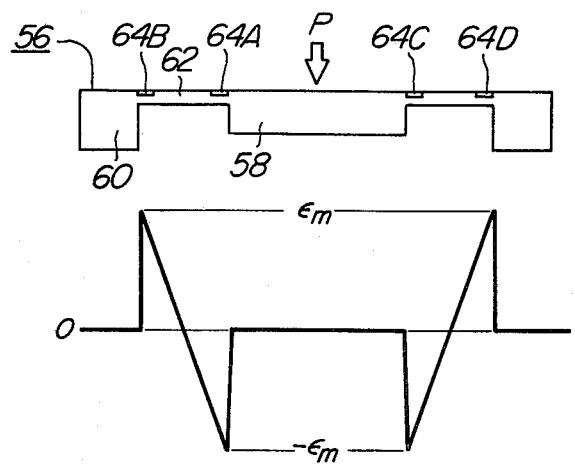
FIG. 4 shows a distribution of strain produced when pressure is applied to the measuring diaphragm.

Referring to FIG. 4, as a pressure P is applied from the direction of an arrow, strain is produced on the surface of the strain producing section 62 of the measuring diaphragm 56 as shown in the figure. The gauge resistance elements 64A, 64B, 64C and 64D located in the vicinity of the position in which a maximum strain $\epsilon_m$, $\epsilon_m$ is indicated are subjected to the piezoresistance effect. As a result, the elements 64B and 64D have their resistance values increased due to tensile strain acting thereon, while the elements 64A and 64C have their resistance values reduced due to compressive strain acting thereon. The Wheatstone bridge consisting of the gauge resistance 64 produces an electrical output which corresponds to the pressure difference.

Application of hydrostatic pressure to the differential pressure measuring transducer assembly as a whole causes a strain component to be produced in the strain producing portion 62 due to the difference in Young's modulus between the measuring diaphragm 56 and glass washer 66. However, since the Young's modulus of the metallic support member 68 formed of an iron-nickel alloy is substantially equal to that of the measuring diaphragm 56 formed of silicon, deformation of the glass washer 66 is inhibited and generation of an electrical output due to the application of hydrostatic pressure can be avoided.

Figure 5:
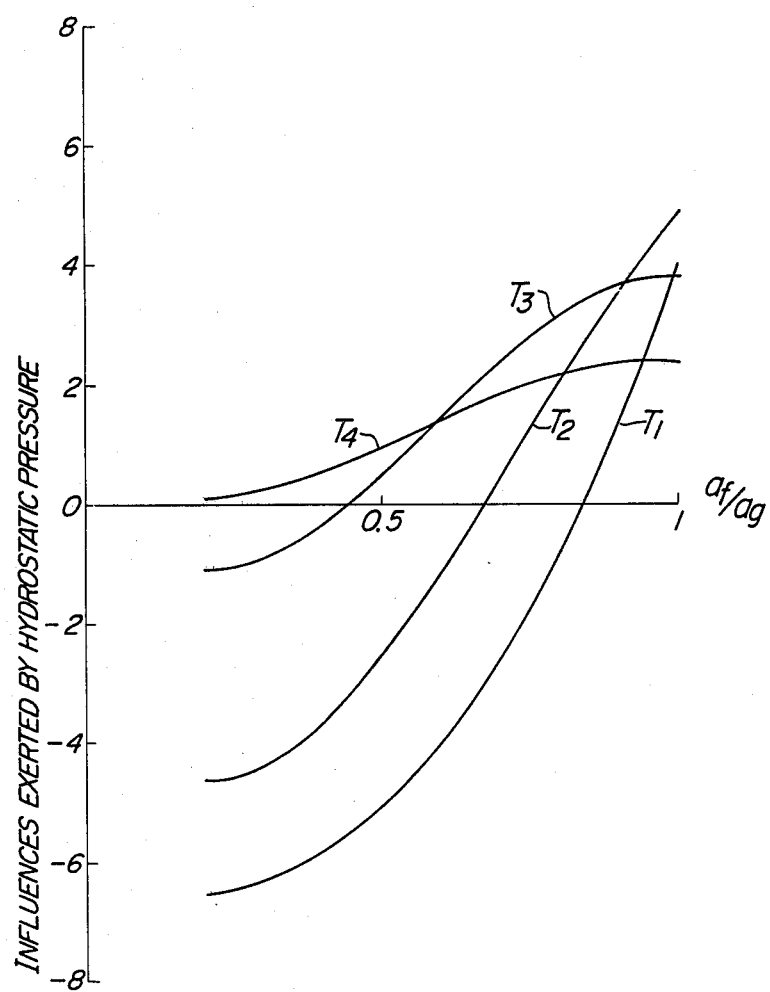
FIG. 5 shows the influences exerted by hydrostatic pressure when the diameter of the metallic support member is varied with respect to the diameter of the glass washer.

FIG. 5 shows the influences exerted by the application of hydrostatic pressure when the diameter of the metallic support member 68 formed of an iron-nickel alloy is carried with respect to the diameter of the glass washer 66 with the thickness of the glass washer 66 functioning as a parameter. Curves $T_1$, $T_2$, $T_3$ and $T_4$ represent the results of tests conducted when the thickness of the glass washer 66 is one half, equal to, twice as great as and three times as great as that of the measuring diaphragm 56 respectively. As can be seen in the figure, to reduce the influences exerted by hydrostatic pressure requires a reduction in the diameter of the metallic support member 68 as the thickness of the glass washer 66 increases. When the thickness of the glass washer 66 is over three times as great as that of the measuring diaphragm 56, it is impossible to reduce the influences exerted by hydrostatic pressure even if the diameter of the metallic support member 68 is reduced to a minimum. Thus, to eliminate the influences exerted by hydrostatic pressure, it is necessary to set the thickness of the glass washer 66 at a value lower than three times as great as that of the measuring diaphragm 56 and to increase the diameter of the metallic support member 68 as the thickness of the glass washer 66 is reduced below the set value.

Figure 6:
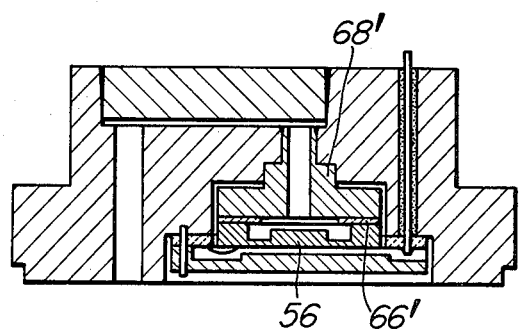
FIG. 6 is a sectional view showing in detail a modification of the differential pressure measuring section.

FIG. 6 shows a construction in which the glass washer 66′ is in the form of a thin film and has its thickness reduced (to several scores to several hundreds of $\mu_m$), and the diameter of one end portion of the metallic support member 68′ is substantially equal to that of the measuring diaphragm 56, based on the results of tests shown in FIG. 5. In this construction, when hydrostatic pressure is applied to the transducer as a whole, the glass washer 66′ is tensioned on both side surfaces thereof due to the fact that the Young's modulus of the metallic support member 68 is higher than that of the glass washer 66 and substantially equal to that of silicon, with a result that the strain produced in the measuring diaphragm 56 which is oriented in one direction due to the difference in Young's modulus between the glass washer 66 and measuring diaphragm 56 can be minimized. Because of this feature, the transducer assembly according to the invention is rendered greatly impervious to the influences exerted by hydrostatic pressure.

It has been ascertained as the results of experiments conducted by us that the metallic support member serving as a backup layer for the glass support member should have a thickness which is at least over twice that of the glass support member, to achieve excellent results.

Figure 7:
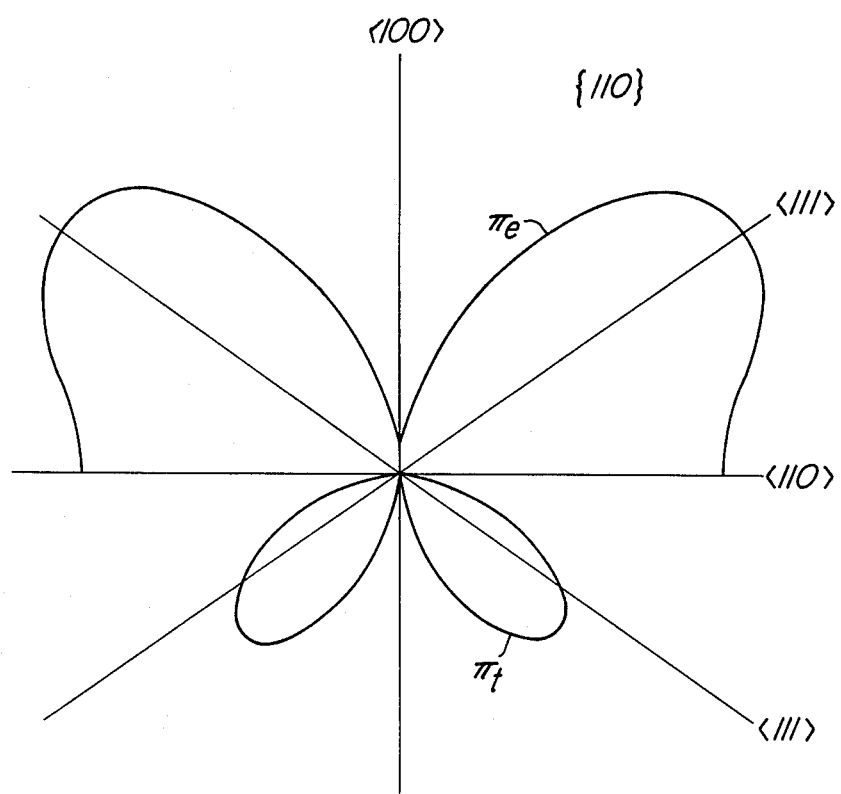
FIG. 7 shows piezoresistance coefficients on the {110} surface.

FIG. 7 shows a distribution of the piezoresistance coefficient $\pi_l$ (obtained when the direction of an electric current through the elements is parallel to the direction of stress) and the piezoresistance coefficient $\pi_t$ (obtained when the current direction and stress direction are normal to each other) of the p-type piezoresistance elements with regard to the crystal surface $\{110\}$ of the measuring diaphragm 56 formed of silicon. The diagram shown in FIG. 7 supports the effectiveness of the $<111>$ axis set forth hereinabove.

FIG. 8 shows a distribution of the piezoresistance coefficients $\pi_l$ and $\pi_t$ with regard to the crystal surface $\{211\}$ taken as another example of crystal surface. It will be seen that the $<111>$ axis has the same effect in the case of the $\{211\}$ surface as in the case of the $\{110\}$ surface. in this construction, the output voltage is high and the strain can be rendered parallel to the gauge resistance, so that the characteristics of the transducer largely depend on the vertically oriented piezoresistance effect.

The results of experiments conducted by us show that changes in the temperature of outputs occurring at the time of constant current excitation are smaller with a vertical piezoresistance effect than with a horizontal piezoresistance effect. The magnitude of nonlinear errors made at the time of a strain-to-resistance change may vary depending on temperature. However, changes in the magnitude of nonlinear errors can be reduced more greatly when a vertical piezoresistance effect is utilized than when a horizontal piezoresistance effect is utilized.

From the foregoing, it will be appreciated that the measuring diaphragm of the aforesaid construction offers the advantages that, since a bridge can be formed by gauge resistance elements arranged radially of the strain producing portion, its output is high in value and the dependence of span and nonlinear errors on temperature can be minimized.

Thus, the invention can provide a differential pressure measuring transducer assembly which can be readily insulated because only the measuring diaphragm is electrically insulated from the transducer body and which is impervious to the influences exerted by hydrostatic pressure.

What we claim is:

1. A differential pressure measuring transducer assembly comprising:
   a differential pressure measuring body having introduced thereinto two fluids differing from each other in pressure;
   a measuring diaphragm formed of semiconductor material including a center boss area of large thickness, a peripheral support flange of large thickness and an annular strain producing portion of small thickness defined between the center boss area and the peripheral support flange and having gauge resistance elements arranged thereon;
   a glass support member attached to the peripheral support flange of the measuring diaphragm;
   a metallic support member mounted between the glass support member and the differential pressure measuring body;
   pressure conducting passage means communicating with the glass support member and the metallic support member; and
   means for applying the two fluids introduced into the differential pressure measuring body differentially to different side surfaces of the measuring diaphragm.

2. A transducer assembly as set forth in claim 1, wherein said center boss area of large thickness is smaller in thickness than said peripheral support flange, and a surface of said glass support member facing the measuring diaphragm is planar, to define a clearance between the center boss area of large thickness and the glass support member.

3. A transducer assembly as set forth in claim 1, wherein said glass support member has a thickness which is less than three times as great as the thickness of the measuring diaphragm.

4. A transducer assembly as set forth in claim 3, wherein said metallic support member has a diameter which is increased as the thickness of said glass support member is reduced.

5. A transducer assembly as set forth in claim 4, wherein said glass support member is in the form of a thin film, and said metallic support member has a diameter equal to that of the measuring diaphragm.

6. A transducer assembly as set forth in claim 1, wherein said glass support member is formed of borosilicate glass, and said metallic support member is formed of one alloy selected from the group consisting of an iron-nickel alloy and an iron-nickel-cobalt alloy.

7. A transducer assembly as set forth in claim 1, wherein a crystal surface of said measuring diaphragm is a {110} surface and said gauge resistance elements are arranged parallel to a <111> axis.

8. A transducer assembly as set forth in claim 1, wherein a crystal surface of said measuring diaphragm is a {211} surface and said gauge resistance elements are arranged parallel to a <111> axis.

9. A differential pressure measuring transducer assembly comprising:
   a pressure receiving body;
   two sealing diaphragms each disposed on one of opposite sides of said pressure receiving body to define a pressure receiving chamber for a high pressure fluid and a pressure receiving chamber for a low pressure fluid on the opposite sides of the pressure receiving body;
   a center diaphragm disposed in the pressure receiving body to define two isolated chambers each communicating with one of said two pressure receiving chambers;
   a measuring diaphragm formed of semiconductor material having gauge resistance elements disposed on one surface thereof and having on the other surface thereof a center boss area of large thickness and a peripheral support flange of large thickness defining therebetween an annular portion of small thickness;
   a glass support member attached at one end portion thereof to the peripheral support flange of the measuring diaphragm on the other surface thereof, said glass support member being formed with a pressure conducting bore;
   a metallic support member attached at one end portion thereof to the other end portion of the glass support member, said metallic support member being formed of a pressure conducting bore communicating with the pressure conducting bore in the glass support member;
   a differential pressure measuring body having connected thereto said metal support member at the other end portion thereof;
   a metallic connector connecting said pressure receiving body to said differential pressure measuring body and formed with a first pressure conducting bore and a second pressure conducting bore, said first pressure conducting bore communicating said the other surface of the measuring diaphragm with said one pressure receiving chamber and said second pressure conducting bore communicating said one surface of the measuring diaphragm with said the other pressure receiving chamber, through said glass support member and said metallic support member; and
   a noncompressive fluid contained in said pressure receiving chambers, said separated chambers and said first and second pressure conducting bores.

10. A transducer assembly as set forth in claim 9, wherein said measuring diaphragm has aluminum wires on the surface thereof for taking out an output therethrough from the gauge resistance elements.

11. A transducer assembly as set forth in claim 10, wherein said aluminum wires extend from said center boss area of large thickness of the measuring diaphragm to said annular portion of small thickness thereof.

* * * * *